Oct. 29, 1963  R. A. HEROLD  3,108,910
PROCESS FOR MAKING ELECTRODES OR ELECTRODE ELEMENTS
FOR ALKALINE STORAGE BATTERIES
AND ARTICLES THUS OBTAINED
Filed Feb. 7, 1961
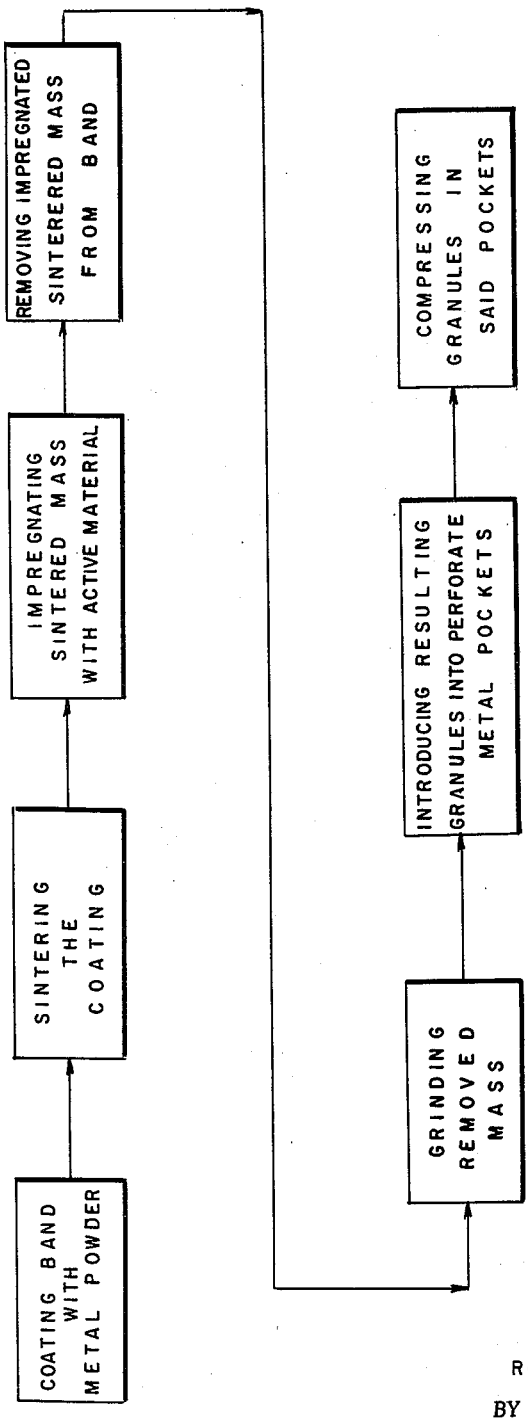
INVENTOR.
RODOLPHE ANDRE HEROLD
BY
ATTORNEYS United States Patent Office 3,108,910
Patented Oct. 29, 1963

3,108,910
PROCESS FOR MAKING ELECTRODES OR ELECTRODE ELEMENTS FOR ALKALINE STORAGE BATTERIES AND ARTICLES THUS OBTAINED
Rodolphe André Herold, Boulogne-Billancourt, France, assignor to Societe des Accumulateurs Fixes et de Traction (Societe Anonyme), Romainville, France, a company of France
Filed Feb. 7, 1961, Ser. No. 87,532
Claims priority, application France Feb. 11, 1960
12 Claims. (Cl. 136—29)

This invention relates to improved processes for manufacturing electrodes or electrode elements or components for alkaline storage batteries and the products of such processes.

A principal object of the present invention is an improved process for making tubular or pockets type electrodes or elements or components of such electrodes intended for use in the alkaline storage batteries.

As is well known, such tubular electrodes have been developed by Edison. According to his process, the positive electrode is rendered electrically conductive, the positive active material thereof constituting essentially nickel hydroxide. It is well known that nickel hydroxide is a non-conducting material, hence the necessity of making it conductive so that it can be used as an active material capable of being charged, which means being oxidized in a higher state of oxidation, and capable of being discharged, which means being reduced to a lower state of oxidation. These operations of charge and discharge can only take place in layers of nickel hydroxide in direct electrical contact with a conductive carrier, said layers having a very small depth such as a few microns. The electrochemical efficiency for charging and discharging is found to be very high if the depth of the said layer is less than 10 microns and to be lower for 20 microns and very low for 50 microns. Hence, every effort has been made for mixing a conductive material with the nickel hydroxide as intimately as possible.

For a comparatively long time, two conventional processes have been in use for obtaining this result, and lately a third more modern solution has been found. These three solutions are the following:

(1) The tubular container is generally made by twisting a thin, finely perforated sheet of nickel plated steel and it then is filled by strongly compressing alternate layers of positive active material (nickel hydroxide to which may be added a given amount of cobalt hydroxide) and of nickel flakes, the latter being used as conductors. The mass thus obtained is partitioned by conductive parts which give it some conductivity.

The principal advantage of this first known solution is that it provides electrodes having a long life and a good capacity and which are capable of being subjected to more than 3000 cycles of charges and discharges, which yields a time of service of at least 10 years.

However, this solution has disadvantages. First, it is costly, chiefly because the manufacture of nickel flakes having a thickness of about 1 micron and 1 or 2 mm.$^2$ area is very costly and complex. The major drawback, however, is found in the fact that the active material is not conductive enough so that it has a very low efficiency. The depth of the nickel hydroxide layer imprisoned between two conductive layers of nickel flakes is practically in the range of from 200 to 400 microns. It is, therefore, at least five times deeper than the elementary working layer in contact with a conductive wall, the acceptable depth of which is of about 20 microns.

(2) Natural graphite flakes are intimately mixed with nickel hydroxide by special milling and rolling processes. Pockets which are box-like in form and made of finely perforated nickel plate steel are filled with this mixture. The assembly of such pockets constitutes the electrodes of the so-called pocket-type.

The active mass thus obtained is on the whole distinctly more conductive than the mass obtained by the first-mentioned process. However, this process presents another unavoidable drawback. Although the quality of graphite used withstands oxidation particularly well, nevertheless, such oxidation takes place during charging, due to anodic polarization. Such oxidation proceeds progressively as the storage battery is used so that the graphite surface which is in contact with the nickel hydroxide, becomes completely oxidized, the rate of oxidation being quicker if the temperature of the electrolyte is higher. The electrode then does not operate satisfactorily any more. The number of charge and discharge cycles resulting with such an electrode is found to be limited to about 1000 in the best cases.

Moreover, such oxidation of the graphite causes carbon dioxide to be formed and to combine with the potassium hydroxide of the electrolyte, thus giving potassium carbonate which is very harmful. In consequence, the electrolyte must be changed very frequently.

(3) The modern solution which has made rapid progress in the latter years consists in utilizing a porous metal body, obtained by sintering very fine metal powders, which is then impregnated with electrochemically active materials. This impregnation is made by precipitating nickel hydroxide, to which cobalt hydroxide may be added, in the pores of the sintered carrier for the positive electrode. The metal walls of the pores are thus in a way coated with layers of nickel hydroxide. The nickel hydroxide layers thus obtained, in contact with the metal walls, are a few microns deep. An excellent efficiency of the active material of such sintered electrodes, even at very high discharge rates, results. Moreover, the life of such electrodes is very long and may be compared to that of tubular electrodes. The manufacture of such electrodes is, of course, very costly, but it is justified by the results obtained at high discharge rates.

If the problem of these electrodes is considered as a whole, two classes of electrodes appear: the ones which can be used for low rate discharges (tubular electrodes which can be discharged to the one hour rate) or medium rate discharges (pocket type electrodes to the 30 or 20 minute rates), and the others (thin sintered electrodes) which can be used for high rate discharges, such as six or even three minutes rates.

The first class of electrodes must be used for those batteries intended for uses in which not very great discharge powers are required, whereas the latter (thin sintered electrodes) fit so-called "noble" batteries, which must give high powers per volume or mass unit.

The electrodes according to the first two above-mentioned old processes are therefore still in use since it would be meaningless to use costly batteries having a high power in the case of low rate discharges. Moreover, for applications where a great capacity is required, without any special power requirement, the batteries in use should have both a high power, and a great capacity. There is still a demand for batteries giving discharges at the 12 minutes rate. The standard solutions are then inadequate and the modern solutions are not suitable.

A principal object and feature of the present invention is to provide a process for manufacturing electrodes and electrode components or elements which remedy the drawbacks of current conventional storage batteries, while widening their field of application.

The process according to the present invention is more especially notable in that it comprises grinding a mass of sintered metal impregnated with electrochemically active materials and in introducing the granular mass thus obtained in perforated metal envelopes.

According to another characteristic or feature of the invention the grinding is carried to the degree obtained by the use of a grinding mill of the coffee-mill type or a similar apparatus.

According to still another characteristic or feature of the invention, the sintered mass is obtained according to the standard known processes, but these are utilized with a wider tolerance concerning the grain size of the metal powder used for making the sintered carrier.

According to still another characteristic or feature of the invention, the impregnation of the sintered body with the active materials is effected in such a way that the ratio of the sintered material weight to the active material is more than 1.

The advantages realized by the processes according to the present invention are directly discernible.

The electrochemically active material of conventional type is incorporated in the pores of the sintered carrier as by conventional impregnation. This carrier is then comminuted to the desired grain size, e.g. in a mill of the coffee-mill type. This has the advantage of producing regularly sized grains or granules without dust, which can be inserted into the electrode pockets or into the electrode tubes of the already existing electrode envelopes.

For such a purpose, the waste products of the manufacture of active sintered carrier electrodes can be advantageously used. But the process according to the invention has given such interesting results that it is quite logical to consider manufacturing an active mass specially intended for the purposes of the invention.

The sintered carrier electrodes are essentially intended for the manufacture of high power batteries. Due to this fact, the metal powder used must have a very fine structure of great regularity so that the porous sintered carriers thus obtained have a great porosity, while having a great number of regularly distributed fine pores. Then the sintering operation must be very carefully conducted so that the sintered carriers are undeformable and strong so that the electrodes will be mechanically rugged. Lastly, when the electrochemically active materials are deposited in the pores, it is necessary to limit their amount so that the depth of the active layer in contact with the walls of the pores do not exceed a few microns. This last condition means that the filling ratio of active material in relation to the weight of the sintered nickel carrier has a limited value. Practically, the weight of active materials deposited in the pores does not exceed the weight of the sintered carrier. An increase of the filling ratio in known structure would moreover risk providing an unfavorable influence on the electrode porosity and on its mechanical strength.

Due to the preparation it is given, and to the function of the active material when used according to the present invention, namely, the grinding of a sintered carrier impregnated with active material, it is no longer necessary to keep the filling ratio within the range which has just been specified. More especially, the nickel powder used for making the sintered porous carrier may have a distinctly larger range of particle size; likewise, the conditions of sintering may be less strict; and lastly, the filling ratio of the active material may be increased without disadvantage. This ratio, instead of being around 1 to 1 may exceed 2 to 1 without any disadvantage. All these steps taken together result in a large decrease of the manufacturing price which becomes profitable.

Other objects and features of the invention will become apparent from the following description and the accompanying drawing which is a diagrammatic showing illustrative of the process embodying the invention.

*Example I*

A particularly advantageous way of carrying out the invention will now be described, as a non-limitative example.

A nickel carbonyl powder suspension is prepared in a carboxymethyl-cellulose solution according to the method described in the Salauze United States Patent No. 2,819,962. A polished nickel-plated steel sheet or band 10 of a small width and relatively large thickness (e.g. a few centimeters wide and 0.5 mm. thick) is passed through this suspension, also in the manner described in the said patent, so that it is coated on both sides with the nickel carbonyl suspension. The coated band or sheet is then passed between doctor blades to provide desired thickness to the coating. The whole is dried in a drier, then sintered in a sintering furnace in the manner described in said patent. The band or plate now coated with two layers of sintered nickel is passed into and through an impregnation apparatus to incorporate electrochemically active material. For this impregnation several processes are already known, and the more suitable will be chosen. The impregnating bath, for example, may be a bath containing the metal salt or salts which are to form the electrochemically active hydroxide which latter is precipitated therefrom by an alkali. The precipitant may be nickel hydroxide alone or with cobalt hydroxide. The impregnation process is repetitively carried out the number of times necessary for obtaining the desired filling ratio which is, as already mentioned, preferably around 2 to 1. This may be achieved as by providing a suitable number of repetitive impregnation operations, but also by controlling the precipitations in such a manner that when the sintered nickel carrier is impregnated with e.g. nickel nitrate, the nickel thereof is partly dissolved due to the acidity of the impregnating media. The dissolved nickel is transformed into nickel hydroxide by the sodium hydroxide during the precipitation. In this way, the efficiency of the impregnating operation is substantially increased. The dissolution of the sintered carrier may reach 30% as an example. The portion of the electrochemically active material derived from the dissolution of the sintered nickel carrier is particularly advantageous because it adheres strongly to the metal carrier.

On leaving the impregnation apparatus, the band passes or is passed through a draw-plate whose cross-section is only very slightly larger than the cross-section of the original nickel-plated steel backing sheet. In this passage, the draw-plate tears off and crumbles the impregnated sintered nickel layers from the sheet.

The impregnated sintered spongy mass, torn off from its backing plate, is then ground in a mill of the type described above to provide granular grains of desired size without powder which are collected in a container.

*Example II*

Another advantageous embodiment consists in replacing the polished nickel-plated steel sheet by a paper or other combustible band which is passed through the coating bath instead of the steel sheet. The coated band is then dried in the drier. This paper or other combustible band is eliminated in the sintering oven so that the sintered mass can be ground directly in the mill on leaving the impregnation apparatus without any need for stripping and be collected as granules in the container. The granular particle products of Example I or II are then utilized to fill perforated metallic tubes or pockets to form the electrodes in conventional ways.

When thin finely perforated nickel-plated steel sheets or bands are used for manufacturing either electrode tubes, or pocket-type electrodes, it is necessary to make allowance for the particle size of the active materials which are in a finely divided state, so that these particles do not leak through the holes of the perforations. It has been found necessary with the known electrodes not to exceed 10% for the perforation ratio, which means that only 10% of the electrode surface areas are exposed to the electrochemical exchanges. Now, however, with the granular products of Example I or II and due to the structure of the new active mass prepared according to these examples of the invention, this leakage through the holes is not to be feared to the same extent, so that the perforation ratio may be increased, and may, as an example, be at least doubled, e.g. 20% or more. The ratio of the electrochemical exchanges possible is therefore greatly improved.

When the granular masses produced by this invention are used in tubular electrodes due to the improved conductivity of the active material and to the enlargement of the area exposed to the electrochemical exchanges, the coefficient of utilization of the active material is increased. It is therefore possible to increase the rated capacity of an electrode tube by about 25%. This improvement is very important since it allows 25% more capacity in the same space.

On the other hand, the electrical performances are substantially improved in discharge by an increase of the discharge rate which rises from the 1 hour rate to the half an hour rate. This improvement renders it possible to meet numerous additional requirements, especially in the case of electrically operated trucks which usually include elevating devices, which latter require heavier currents in their discharge.

When the granular masses produced by this invention are used in pocket-type electrodes, the essential advantage obtained consists in a substantially increased life which becomes practically that of the tubular electrodes. The useful life of the storage battery using these pocket electrodes is thus multiplied by about 3. The drawback of a carbonation of the electrolyte which takes place through the oxidation of graphite, in known pocket electrodes, no longer exists and the electrolyte has much more constant properties.

Moreover, a better coefficient of utilization of the active mass is obtained, which permits an increase of the rated capacity of the corresponding batteries, without fear of a decrease of the electric performances since there is no more oxidation of the conductive carrier which, in known batteries, was previously made of graphite. Lastly, due to the improved conductivity of the active mass (the conductivity of nickel is distinctly higher than that of graphite), the batteries fitted with pocket electrodes filled with the granular products made according to this invention can be discharged at rates in the range of from the 15 minute rate to the 12 minute rate. Thus, a want is filled in the range of batteries which did not comprise batteries for high rate discharge, e.g. 12 minute rate.

To sum up, it may be said that, due to the invention, on the one hand the performances and characteristics of the standard alkaline storage batteries have been improved and, on the other hand, their field of application has been enlarged.

The invention comprises also, as new industrial products or articles of manufacture, the electrodes and electrode elements obtained according to the above-described exemplary processes, and the storage batteries in which they are incorporated.

Although specific embodiments of the invention have been described, variations within the scope of the appended claims are possible and are contemplated. There is no intention of limitation to the exact details hereinabove presented.

What is claimed is:

1. A process for the preparation of electrode components for alkaline storage batteries comprising the steps of providing a metallic band, applying a metallic powder coating on at least one of the faces of the band, sintering the applied powder coating to form a sintered metal mass on the band, then impregnating this mass with electrochemically active material, then removing the impregnated sintered mass from the band, then grinding the removed impregnated mass to selected granular size, and then introducing the resulting granules into perforate metal pockets and strongly compressing the granules therein.

2. The process according to claim 1 wherein the said impregnation is effected to provide a ratio of from approximately 1 to about 2 between the weight of the sintered mass and that of said electrochemically active material.

3. A process for the preparation of electrode components for alkaline storage batteries comprising the steps of providing a metallic band having polished surfaces, passing the band through a metal powder suspension to provide coatings of said suspension on the faces of the band, sintering the applied coatings to form sintered metal masses on the faces of said band, then impregnating these masses with electrochemically active material, then stripping the impregnated sintered metal masses from the faces of the band, then grinding the removed masses to selected granular size and thereafter introducing the resulting granules into perforate metal pockets and strongly compressing the granules therein.

4. The process according to claim 3 wherein said suspension comprises nickel carbonyl in a carboxymethylcellulose solution.

5. A process for the preparation of electrode components for alkaline storage batteries comprising the steps of providing a combustible band, applying a metallic powder coating on at least one face of said band, sintering the applied powder coating to form a sintered metal mass while at the same time burning away the band, then impregnating the sintered mass with electrochemically active material, then grinding this impregnated mass to granular size and then introducing the resulting granules into perforate metal pockets and strongly compressing the granules therein.

6. The process according to claim 5 wherein said impregnation is provided to provide a ratio of from approximately 1 to about 2 between the weight of the sintered mass and that of said electrochemically active material.

7. A process for the preparation of electrode components for alkaline storage batteries comprising the steps of providing a combustible band, passing the band through a metal powder suspension to provide coatings of said suspension on the faces of the band, sintering the applied coatings to form a sintered metal mass while at the same time burning away the band, then impregnating the sintered mass with electrochemically active material, then grinding this impregnated mass to selected granular size, and then introducing the resulting granules into perforate metal pockets and strongly compressing the granules therein.

8. The process according to claim 7 wherein said suspension comprises nickel carbonyl in a carboxymethylcellulose solution.

9. As a new article of manufacture an electrode for an alkaline storage battery comprising perforate metallic envelopes containing ground, compacted sintered metal powder impregnated with electrochemically active material.

10. The article of manufacture of claim 9 wherein the area of the perforations in the envelope is 20% of the total area thereof.

11. An alkaline storage cell comprising electrodes, said electrodes comprising perforate metallic envelopes containing ground, compacted sintered metal powder impregnated with electrochemically active material.

12. The cell of claim 11 wherein the area of the perforations in the envelope is upwards of 20% of the total area thereof.

References Cited in the file of this patent
UNITED STATES PATENTS

| | | |
|---|---|---|
| 2,654,795 | Brill et al. | Oct. 6, 1953 |
| 2,658,099 | Basset | Nov. 3, 1953 |
| 2,672,494 | Fleischer | Mar. 16, 1954 |
| 2,820,077 | Salauze | Jan. 14, 1958 |
| 2,861,115 | Berg | Nov. 18, 1958 |
| 2,880,257 | Murphy | Mar. 31, 1959 |
| 2,909,586 | Hagspihl | Oct. 20, 1959 |
| 2,980,748 | Piroux | Apr. 18, 1961 |
| 2,991,324 | Vogt | July 4, 1961 |
| 3,007,991 | Duddy | Nov. 7, 1961 |